United States Patent [19]

Wilkinson

[11] 4,060,008
[45] Nov. 29, 1977

[54] THROTTLE CONTROL DEVICE

[76] Inventor: Jerome L. Wilkinson, 1322 Des Moines St., Des Moines, Iowa 50316

[21] Appl. No.: 695,521

[22] Filed: June 14, 1976

[51] Int. Cl.$^2$ .................. G05G 5/04; G05G 5/16
[52] U.S. Cl. .................. 74/488; 24/251; 24/252 A; 74/526; 74/531; 192/3 T
[58] Field of Search .......... 74/488, 489, 504, 526, 74/531; 192/3 T; 24/251, 252 A

[56] References Cited

U.S. PATENT DOCUMENTS

| | | | |
|---|---|---|---|
| 306,344 | 10/1884 | Morgan | 74/526 X |
| 368,467 | 8/1887 | Fouts | 24/252 A |
| 1,185,467 | 5/1916 | Beauchamp | 74/488 |
| 1,473,326 | 11/1923 | Slawienski | 74/489 |
| 2,459,012 | 1/1949 | Barth | 74/526 |
| 2,825,971 | 3/1958 | Huff | 74/526 X |
| 3,982,446 | 9/1976 | Van Dyken | 74/488 |

FOREIGN PATENT DOCUMENTS 862,475  3/1961  United Kingdom ............... 74/489

Primary Examiner—Allan D. Herrmann
Attorney, Agent, or Firm—Henderson, Strom & Sturm

[57] ABSTRACT

A throttle control device for use with a rotating throttle control member of a type being biased to an idle position such as commonly used on motorcycles. A pair of elongated members having arcuate surfaces thereon adapted to contact the throttle control member are pivotally connected together at one of the ends thereof and an O-ring structure is provided for biasing the opposite ends of the elongated members together, thereby causing the elongated members to be in frictional engagement with the control member. Because of this structure, the throttle control device of this invention in cooperation with a brake lever or other projection can be used to maintain the throttle control member at any desired setting, but allows the person in control of the throttle control device to selectively and instantaneously overcome the frictional engagement of the throttle control device with respect to the throttle control member to turn the throttle back to an idle position when necessary.

6 Claims, 4 Drawing Figures

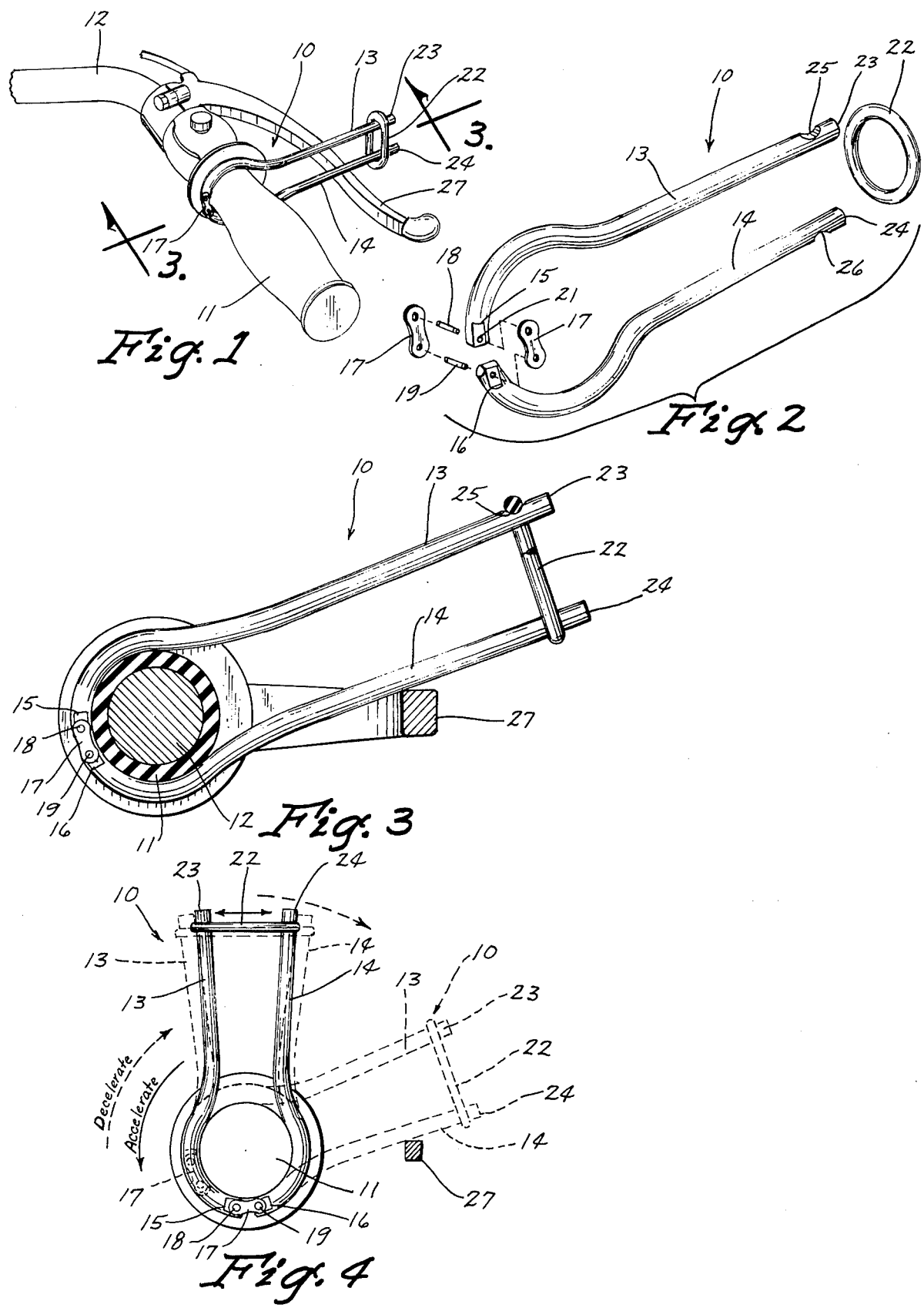

THROTTLE CONTROL DEVICE

BACKGROUND OF THE INVENTION

The present invention relates generally to engine throttle controls, and more particularly to such throttle controls using a rotating handle as a control member.

As is very commonly known, the standard motorcycle twist grip throttle operates the motorcycle engine carburetor throttle setting by means of a cable which translates an angular change in the twist grip to a longitudinal movement. In order to insure prompt and accurate throttle reduction or release, it is necessary to provide one or more springs operating at the carburetor end of the cable, which springs tend to forcibly close the carburetor to an idle position. It is against this spring means that the motorcycle operator must maintain his selected throttle setting by twisting the twist grip as necessary. Maintaining a steady throttle opening over an extended period of time, for example when it is desired to go a substantial distance at a substantially constant speed, can become very fatiguing, particularly with the more powerful motorcycles which may have a plurality of carburetors with a commensuarate necessity for more powerful throttle return spring means.

It has been suggested that the throttle control springs can be simply weakened; however, it has been found that the return spring system cannot be sufficiently weakened to afford any effective relief to the operator while still maintaining satisfactory throttle closure action. Thus, those skilled in the art will appreciate the desirability of providing means for maintaining a selected throttle while still allowing the motorcycle operator to easily and quickly turn the throttle back to idle speed when necessary.

One such device which was designed to generally solve the above mentioned problem is disclosed in U.S. Pat. No. 3,752,006. This particular patent does, however, have several parts which must be secured to the throttle mechanism and which assembly does require a certain amount of time for installation. It has been determined, however, that there is a need for such a device which cam be very quickly and simply attached or disconnected from the throttle apparatus in much less time.

SUMMARY OF THE INVENTION

The present invention relates to a throttle control device for an engine, which throttle control has a rotary control member which is biased to a idle position, but which is rotatable by overcoming the bias to increase the amount of fuel being fed to the engine. The device includes a first member and a second member which are respectively pivotally attached at one of the ends thereof and are adapted to fit over the throttle control member. The other ends of the first and second members are selctively attached together whereby the first and second members are in tight frictional contact with the control member. The frictional contact of the first and second members against the control member generally fixes the position of the device with respect to the control member so that when the device contacts a brake handle or other projection, for example on a motorcycle, the throttle control member is held in a position overcoming the bias thereof and thereby keeping the throttle at a constant level. The frictional contact of the first and second members against the control member can, however, be overcome should such be necessary by merely twisting the throttle member manually in the idle direction; that is, in the same direction to which the throttle control member is being biased. Because of such an arrangement, the device of the present invention can be used to set the throttle at a constant level, but yet allow it to be instantaneously released and moved from that position if necessary.

An object of the present invention is to provide a device for overcoming the bias of a throttle handle so that the throttle can be set at a constant level.

Another object of the invention is to provide such a throttle control which can be quickly and readily overcome manually.

A further object of the invention is to provide a throttle control device which can be attached very quickly to a throttle handle and which can as readily be disconnected from the throttle handle when desired.

Still another object of the invention is to provide a new and improved throttle control apparatus for such devices as motorcycles and outboard motors.

A still further object of the invention is to provide a throttle control apparatus which is simple and economical to produce and which is nevertheless dependable to use.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the present invention attached to a motorcycle;

FIG. 2 is an exploded perspective view of a preferred embodiment of the present invention;

FIG. 3 is a cross-sectional view taken along line 3—3 of FIG. 1; and

FIG. 4 is a view similar to FIG. 3 but showing the device in several positions of operation as indicated by solid and dashed lines.

DESCRIPTION OF THE PREFERRED EMBODIMENT

Referring now to the drawings wherein like reference numerals designate identical or corresponding parts throughout the several views, FIG. 1 shows the present invention 10 attached to a throttle control member 11 of a motorcycle.

In FIG. 1 the righthand position 12 of a motorcycle handlebar had a throttle control member or handle 11 rotatably attached thereto for the purpose of controlling the throttle on a motorcycle engine (not shown). This particular structure is conventional and well known in the art, for example as shown and disclosed in U.S. Pat. No. 3,752,006. Basically, however, the throttle control handle 11 is biased in a clockwise direction when viewed in FIGS. 3 and 4 to a point at which the motorcycle engine would receive enough fuel to idle smoothly. When the device 10 of the present invention is removed from the throttle control handle 11 in the way that a motorcycle would be equipped when purchased, the throttle control 11 would need to be turned in a clockwise direction as viewed from FIGS. 3 and 4 when it was desired to increase the throttle setting and thereby cause the speed of the motorcycle engine to increase. When the manual grip of the throttle control handle 11 is released, then, of course, the throttle control member 11 would move in a clockwise direction (FIG. 3) in the direction to which it is biased and therefore back to an idle position.

As mentioned above, however, it has been found that it is very tiring to hold the throttle control handle 11 at a constant rotary position over a substantial traveling distance, and it is for that reason that throttle control devices such as those in the present invention have been designed.

The present invention 10 includes a first member 13 and a second member 14 which are pivotally attached together at the first ends 15 and 16 respectively thereof. This pivotal connection is not critical in its structure, but the particular pivotal connection of the preferred embodiment shown includes a pair of links 17 which are interconnected at the top ends thereof to the first end 15 of the first member 13 by a pin 18 which also extends through opening 21, and at the bottom ends thereof to the first end 16 of the second member 14 by a pin 19 which extends through the bottom openings of the links 17 and through the opening 20 in the second member 14. Other devices for making this pivotal connection could obviously be used without departing from the scope of this invention.

A rubber resilient O-ring 22 is provided for the purpose of biasing the other ends 23 and 24 of the first and second members 13 and 14 respectively together, and notches 25 and 26 are provided for reception of the O-ring 22 to keep it from being displaced along the device 10.

In operation, the driver of the motorcycle, before beginning upon a journey, would place the device 10 around the handle 11 to the position as shown in FIG. 3 and with the O-ring 22 in place as shown in FIG. 3, such that the throttle control handle 11 would be in an idle position. He would then start the engine of his motorcycle, if it was not already started, and if it was necessary during such starting procedure to increase the throttle setting by turning the throttle control handle 11 in a counterclockwise direction (FIGS. 3 and 4) to increase the throttle opening, this could easily be done and the device 10 would move approximately from the lower position shown in dashed lines in FIG. 4 to the upper position shown in solid lines in FIG. 4, for example.

Once the motorcycle is on its way and moving at the rate desired and it is desired to maintain that speed for a substantial period of time, the device 10, which would then be approximately in the position shown in solid lines in FIG. 4, would then be pushed with the left hand from the position shown in solid lines in FIG. 4 to the lowered position shown in dashed lines in FIG. 4 whereby the second member 14 is in abutment with the brake lever 27. This would, of course, be done while the right hand holds the throttle handle 11 at the desired rotary setting. This position can also be considered to be the position shown in FIG. 3, and in this position the throttle control handle 11 will be in frictional engagement with the first and second members 13 and 14 respectively of the device 10; and, while the throttle control handle 11 is being biased in a clockwise direction as viewed in FIGS. 3 and 4, the device 10 is also being so biased because of the frictional engagement with the throttle control handle 11. However, because of the previously mentioned abutment of the second member 14 with the brake handle 27, the force biasing the throttle control handle 11 to the idle position is overcome and the throttle is therefore maintained at the desired level and will so remain unless it is desired to change the throttle setting.

If it is desired to increase the throttle setting, then the previously outlined procedure would be used again whereby the right hand would turn the throttle control handle 11 in a counterclockwise direction and hold it at the desired setting while the left hand would then push downwardly (clockwise) on the device 10 until it comes in contact with the brake lever 27, at which time the right hand can then be removed, or at least only gently rested upon the throttle control handle 11.

If it is desired to release the throttle control mechanism 11, for example should an emergency situation arise causing a need for the motorcycle to be stopped, the motorcycle operator could merely grasp the throttle control lever 11 tightly and turn it in a clockwise direction (FIG. 3) thereby causing the throttle control lever 11 to rotate with respect to the device 10 by overcoming the frictional contact between the members 11, 13 and 14. The brake, through handle 27, can be applied whether or not the device 10 is attached to the throttle control member 11.

It is important to note that if the device is installed on the motorcycle when it is in an idle position and not moved, then the motorcycle could be operated as though the device were not present at all. Consequently, it would be available for operation at any time when it was desired to go at a substantially constant speed for a considerable period of time by utilizing the procedure outlined above.

Consequently, it can be seen that the disclosed preferred embodiment does indeed accomplish the objects mentioned above. Obviously, many modifications and variations of the present invention are possible in light of the above teachings. For example, it is noted that whether the members 13 and 14 of the device 10 contact a brake handle or a motorcycle or any other device on a motorcycle, or other device having a rotary throttle control member, is fully equivalent. It is therefore to be understood that, within the scope of the appended claims, the invention may be practiced otherwise than as specifically described.

I claim:

1. A throttle control device comprising:
   a first member having a first end and a second end;
   a second member having a first end and a second end;
   means for pivotally attaching the first ends of said first and second members with respect to each other, said pivotally attaching means including a link member, means for pivotally connecting the link member to said first member along a first pivotal axis and means for pivotally connecting said link member to said second member along a second pivotal axis, said first and second pivotal axis being substantially parallel with respect to each other; and
   means for selectively connecting said second ends together and holding the first ends of said first and second members in direct frictional engagement with a throttle handle member.

2. A throttle control device as defined in claim 1 wherein said connecting means comprises means for biasing said second ends together.

3. A throttle control device as defined in claim 2 wherein said second ends have notches disposed therein and said biasing means includes a resilient O-ring selectively disposed in said notches.

4. A throttle control device as defined in claim 1 wherein the first end of said first and second members include arcuately shaped portions adapted to engage said throttle handle member.

5. In combination, a frame member having a throttle handle of a type having an elongated handle member having a substantially circular portion thereon and rotatable about a longitudinal axis, said handle member being biased to an idle position and rotatable to accelerated positiones, and a brake lever connected to and extending from said frame member adjacent to said throttle handle, the improvement comprising:
 a first member having a first end and a second end;
 a second member having a first end and a second end;
 means for pivotally attaching the first ends of said first and second members with respect to each other;
 means selectively connecting said second ends together whereby a throttle handle member disposed between the first ends of said first and second members will be frictionally engaged; and
 means provided on one of said first and second members for selectively contacting said brake lever thereby neutralizing the bias on said throttle handle and holding said throttle handle in a desired position while at the same time permitting a motorcycle operator to rotate the throttle handle further towards the idle position if desired by manually applying a rotating force great enough to overcome the frictional contact between the first and second members and the throttle handle.

6. A throttle control device as defined in claim 5 wherein said connecting means comprises means for biasing said second end towards each other.

* * * * *